No. 854,655. PATENTED MAY 21, 1907.
E. F. KRELL.
VEHICLE WHEEL.
APPLICATION FILED NOV. 11, 1905.
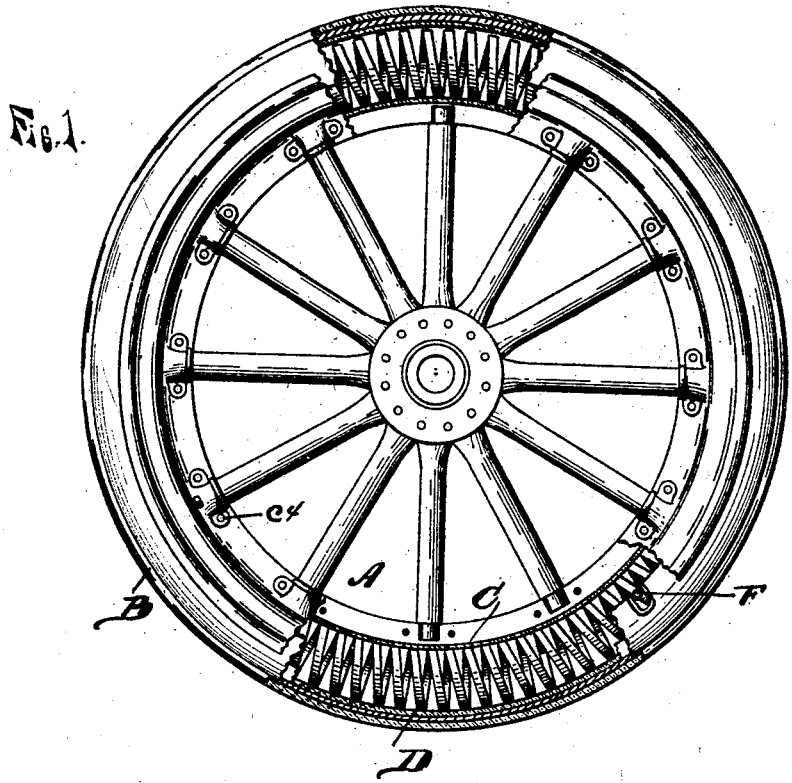
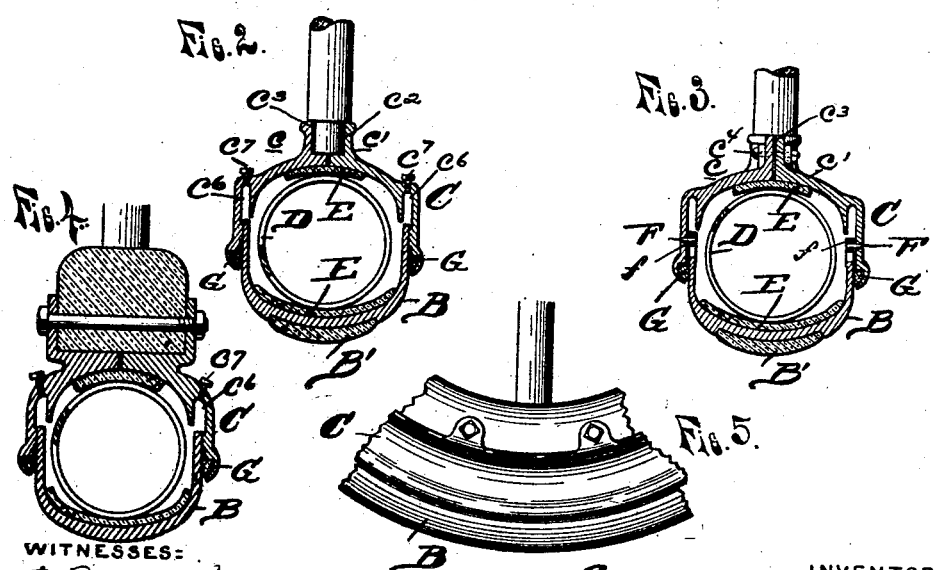
WITNESSES:
INVENTOR

UNITED STATES PATENT OFFICE.

EMIL F. KRELL, OF DETROIT, MICHIGAN.

VEHICLE-WHEEL.

No. 854,655.  Specification of Letters Patent.  Patented May 21, 1907.

Application filed November 11, 1905. Serial No. 286,781.

*To all whom it may concern:*

Be it known that I, EMIL F. KRELL, a citizen of the United States, residing at Detroit, county of Wayne, State of Michigan, have invented a certain new and useful Improvement in Vehicle-Wheels; and I declare the following to be a full, clear, and exact description of the same, such as will enable others skilled in the art to which it pertains to make and use the same, reference being had to the accompanying drawings, which form a part of this specification.

My invention relates to an improvement in vehicle wheels shown in the accompanying drawings and more particularly set forth in the following specification and claims.

In the drawings:—Figure 1 is a side elevation of the vehicle wheel showing the parts broken away and in section. Fig. 2 is a cross sectional view through the rim and tire. Fig. 3 is a similar cross sectional view showing the means employed to lock the telescoping parts together. Fig. 4 is a cross sectional view showing a variation. Fig. 5 is a detail view showing Fig. 4 in side elevation.

The object of my invention is to construct a wheel, more especially for automobiles, having all the resiliency of a pneumatic tire with the added advantage of increased life or wearing qualities.

A further object of my invention is the simplicity of its construction and the ease with which the several parts may be assembled.

Referring to the letters of reference shown on the drawings, A is an automobile wheel, and B its outer rim, preferably of rolled steel, in which is inserted a rubber tread B', suitably secured thereto. C is the other portion of the rim with which the part B has telescopic engagement. The part C is composed of duplicate portions $c$ and $c'$ secured together by bolts $c^4$ and provided with recesses $c^2$ to receive the ends of the spoke. A gasket $c^3$ is inserted between the parts $c$ and $c'$, lining also the spoke sockets or recesses $c^2$. $c^6$ are channels to receive the projecting ends of the outer rim B. $c^7$ are oil cups, by which means, the contacting surfaces of the inner and outer rims are lubricated.

D is a coil or spirally wound spring, housed within the portions B and C.

E, E, indicate shoes of leather or other fibrous material, located between the spring and the telescopic rims of the wheel.

F indicates a locking pin secured in the rim C and projecting into a suitable opening formed in the rim B. This pin may be provided with a sleeve $f$, the object of the pin being to hold the rims so as to rotate together.

G indicates a suitable packing of rubber or other material, housed within a depression formed in the rim C and designed to prevent the entry of dust or moisture between the contacting surfaces of the rim.

It will be seen that by the use of my invention, I am able to retain all the resiliency of a pneumatic tire, with the added advantage that I do away with the possibility of puncturing the tire and materially increase the life of the same. It will also be seen that should the spring flatten out through wear, the outer rim B will telescope with the inner portion C to such an extent that the projecting flanges will bear against the end walls of the channels $c^6$, resulting in what may be considered a solid tire, so that under all conditions the vehicle will be able to proceed.

In the variation shown in Figs. 4 and 5, the inner portions of the telescopic rim are secured to the felly of an ordinary vehicle wheel. The drawing in this case shows the outer rim without the rubber or fibrous shoe, shown in the other views. It may, however, be provided with a leather or rubber shoe, if desired.

What I claim is:—

1. In a vehicle wheel, a metallic rim formed in two sections having telescopic relation one with the other, an elastic compressible element housed within the parts adapted to act upon both parts of the rim to keep them in elastic relation, one rim portion being formed of two longitudinal parts bolted together upon suitable packing material, substantially as described.

2. In a vehicle wheel, a rim formed in two sections having telescopic relation one with the other, a spiral spring housed within the parts adapted to act upon both parts of the rim to keep them in elastic relation, and a fibrous material between the spring and the telescoping rims of the wheel, substantially as described.

3. In a vehicle wheel, a metallic rim formed in two sections having telescopic relation one with the other, a spiral spring housed within the parts adapted to act upon both parts of the rim to keep them in elastic relation, one rim portion being formed of two longitudinal parts bolted together upon suitable packing material, substantially as described.

4. In a vehicle wheel, a metallic rim formed in two sections having telescopic relation one with the other, the inner portion formed of two longitudinal parts embracing the ends of the spokes and bolted together, an elastic compressible element housed within the rim portions, and means for lubricating the telescoping parts, substantially as described.

5. In a vehicle wheel, a metallic rim formed of two U-shaped sections having telescopic relation one with the other, one rim section formed of two longitudinal parts bolted together to embrace the spokes, a spiral spring housed within the U-shaped sections to keep the parts in elastic relation, and means for holding the telescoping parts in engagement, substantially as described.

In testimony whereof, I sign this specification in the presence of two witnesses.

EMIL F. KRELL.

Witnesses:
  MAUDE SMITH,
  HENRY E. VILLEROT.